United States Patent [19]

Trost et al.

[11] Patent Number: 4,549,419

[45] Date of Patent: Oct. 29, 1985

[54] BLANK-FEEDING SYSTEM FOR DIE-STAMPING PRESS

[75] Inventors: Nikolaus B. Trost; Heinz Groos, both of Netphen, Fed. Rep. of Germany

[73] Assignee: Firma Theodor Grabener, Netphen, Fed. Rep. of Germany

[21] Appl. No.: 555,472

[22] Filed: Nov. 28, 1983

[30] Foreign Application Priority Data

Nov. 30, 1982 [DE] Fed. Rep. of Germany ....... 3244201

[51] Int. Cl.[4] ...................... B21D 43/02; B21D 55/00; B23G 9/00

[52] U.S. Cl. .......................................... 72/4; 72/417; 72/418; 72/421; 72/31; 72/359; 198/394; 10/162 A; 10/169

[58] Field of Search .................. 72/405, 356, 417–419, 72/361, 421, 4, 31, 359; 10/6, 155 A, 155 R, 19, 162 A, 169; 198/394

[56] References Cited

U.S. PATENT DOCUMENTS

| | | | |
|---|---|---|---|
| 1,918,150 | 7/1933 | Swahnberg et al. | 10/DIG. 2 |
| 2,657,403 | 11/1953 | Eade et al. | 10/169 |
| 3,483,726 | 12/1969 | Burke et al. | 72/427 |
| 3,760,443 | 9/1973 | Jackson | 10/162 A |
| 4,015,301 | 4/1977 | Lee | 10/169 |
| 4,044,592 | 8/1977 | Carriera et al. | 72/359 |
| 4,172,377 | 10/1979 | Shiber | 10/169 |
| 4,306,324 | 12/1981 | Land et al. | 10/19 |

*Primary Examiner*—Lowell A. Larson

*Attorney, Agent, or Firm*—Karl F. Ross; Herbert Dubno

[57] ABSTRACT

Blanks of noncircular, especially polygonal (e.g. heptagonal), outline are fed to a die-stamping press of an embossing plant such as a mint by means of a turntable with radially oriented transport plates projecting beyond its periphery at angularly equispaced locations. Each transport plate has an outwardly open recess with inner edges conforming to part of the blank outline and with two substantially parallel jaws spaced apart by the maximum width of the blanks, the depth of the recess being less than this maximum width to let an inserted blank protrude by one corner in an incorrect position and by two corners but to a lesser extent in a correct position. The engaged blanks are advanced stepwise from a loading station to the die press over about half the circumference of the turntable; in a first quadrant their path is bounded by a fixed ring segment accommodating incorrectly positioned blanks while in a second quadrant another ring segment, of slightly lesser radius, tends to reposition such blanks properly in their recesses. The latter ring segment is divided into several independently spring-loaded sections which are outwardly yieldable, one such section actuating a sensing switch to stop the press and the turntable motion upon being repressed by a blank resisting reorientation. At the die press an oncoming blank is restrained by a slider which is cammed radially outward by an ascending lower die and by a descending upper die to allow for a small radial expansion of the blank during embossing.

14 Claims, 7 Drawing Figures

BLANK-FEEDING SYSTEM FOR DIE-STAMPING PRESS

FIELD OF THE INVENTION

Our present invention relates to a system for the feeding of noncircular blanks, especially polygonal blanks, to a die-stamping or coining press of an embossing plant such as a mint.

BACKGROUND OF THE INVENTION

In the die-stamping of coins or similar flat objects having the outline of a regular polygon it is necessary to insure proper orientation of each blank relative to the embossing dies. When the press includes a retainer in the form of a collar or bushing of correspondingly polygonal inner periphery in which the blank is seated while being embossed, each blank must be delivered to the retainer in the proper angular position so as to be receivable therein; the arrival of an incorrectly oriented blank at the retainer would jam the mechanism. The use of specially designed grippers reciprocating between the press and a stack of fresh blanks solves the problem of orientation, yet such a conventional feeding system operates at a rather slow rate of not more than about 200 press cycles per minute.

Another known solution resides in the provision of a turntable with polygonal cutouts into which the stacked blanks drop one by one from above for successive transportation to the die press. Such a system, however, does not permit a significant acceleration of the operating rate since the dropping of each blank into an aligned cutout requires a certain time.

Still another prior-art feeding system utilizes a turntable with cutouts in the form of outwardly open recesses into which the blanks are inserted by a radially moving slider; the latter is flanked by resilient cheeks designed to orient each blank in the proper angular position for introduction into a confronting recess. These recesses, too, are bounded by resilient segments designed to hold each blank in its insertion position during transportation to the die press. Here, again, reliable operation designed to avoid jamming or breakages requires the feed rate and therefore the number of press cycles per minute to be limited to hardly more than the aforementioned maximum; this is partly due to the fact that the rotary speed of the turntable must be kept low enough to minimize centrifugal forces which would tend to dislodge the blanks from their recesses.

OBJECTS OF THE INVENTION

The general object of our present invention, therefore, is to provide a blank-feeding system of the last-mentioned type—i.e. one wherein a turntable with outwardly open peripheral cutouts transports the blanks from a loading station to a die-stamping press—which is able to operate at a faster rate than the conventional arrangements referred to.

A more particular object is to provide means in such a system for positively preventing the introduction of an improperly positioned blank into the die press.

SUMMARY OF THE INVENTION

In accordance with our present improvement, each blank-receiving cutout of an intermittently rotating turntable synchronized with an associated die press is a radially outwardly open recess with angularly adjoining inner edges conforming to part of the polygonal outline of the blanks to be transported, this recess further having a pair of substantially parallel jaws that are spaced apart by about the maximum width of the blanks for receiving same in any angular position from the associated loading means. The radial depth of the recess is less than the minimum width of the blanks and its inner edges are so oriented that a blank inserted in registry therewith protrudes to a minor extent with one side of the polygon, i.e. with two of its corners, whereas a blank inserted out of registry protrudes to a larger extent with but one corner. The path of the inserted blanks between the loading station and the die press is bounded in a first part thereof by a first ring segment centered on the axis of rotation of the turntable and separated from the orbit of the jaws by a first arcuate clearance which accommodates both properly and improperly inserted blanks; a second part of this path is bounded by a second ring segment centered on the axis of rotation and separated from that orbit by a slightly narrower second arcuate clearance accommodating only those blanks that are properly inserted, i.e. which register with the inner edges of the recesses. The edge of the second ring segment adjacent the first ring segment forms a discontinuity which tends to reorient an improperly positioned blank by engaging its protruding corner.

While the first ring segment ought to be fixedly positioned on the structure supporting the turntable, the second ring segment preferably is elastically yieldable in the outward direction so as not to cause a blockage when an improperly positioned blank resists repositioning upon its protruding corner encountering the inwardly projecting edge of the latter segment. This will allow the ring segment to be cammed outwardly and to let the blank pass by its projecting edge whereupon the inwardly acting biasing force will again tend to bring that blank into the right position. We further prefer to provide this second ring segment with sensing means such as a limit switch responsive to its continuing outward repression by an incorrectly positioned blank for emitting an alarm signal and/or arresting both the turntable and the press in order to prevent jamming; normal operation will be resumed after the disturbing blank has been manually removed or reoriented.

Advantageously, this second ring segment is divided into a plurality of sections which are independently spring-loaded. Only a section remote from the first ring segment, e.g. the middle one of three sections, is then provided with the aforementioned sensing means so that operations are interrupted only when the preceding section has failed to reorient the improperly positioned blank. Moreover, the subdivision of the second ring segment into at least three sections allows this segment to be extended over an arc of about 90° with generally radially directed spring forces; with 12 recesses equispaced along the periphery of the turntable, each section will then be in contact with only one blank at a time. The first ring segment could also encompass about a quadrant of the circumference of the turntable so that the loading station and the die press can be disposed at diametrically opposite locations as has been found convenient in practice.

Especially when the second ring segment is elastically biased as noted above, it will be advantageous to dispose fixed abutment means with a preferably much shorter inner peripheral edge confronting the turntable periphery in the region of the press, with an intervening arcuate clearance of the same width as the clearance normally existing between the second ring segment and the orbit of the recess jaws. This will insure that the blanks approaching the press, which by now are all properly oriented, are positively maintained in that position. However, at the very point where a blank-carrying recess comes to rest between coacting dies of the press which operate to remove the blank from its recess, emboss it and then return it to the recess, it may be necessary to allow for a certain radial expansion of the stamped blank as it turns into a finished workpiece. Thus, a further feature of our invention resides in the provision of a retractable slider within or in lieu of the fixed abutment means referred to, this slider being operatively coupled with the die press for radially outward motion before the return of the stamped workpiece to its recess and preferably also during the initial removal of the blank from that recess. In particular, when the blank is to be lifted out of its recess by an ascending die for engagement with an upper die within an overlying retaining collar of bushing from which it is subsequently dislodged by the descending upper die, the two dies may coact with the slider by way of respective cam means to retract same during an upstroke of the lower die and during a downstroke of the upper die. Since the upper die approaches the recess only at the end of a downstroke dislodging the stamped workpiece from the retaining collar, the second cam means may include a lost-motion coupling.

In all instances we prefer to use transport plates which are detachably secured to the turntable and have radially projecting recessed ends forming the blank-receiving cutouts. This will allow the same turntable to be used with differently shaped blanks for whose embossing, of course, the die press will also have to be suitably modified; furthermore, such a plate can be readily replaced when the boundary of its recess becomes excessively worn.

BRIEF DESCRIPTION OF THE DRAWING

The above and other features of our invention will now be described in detail with reference to the accompanying drawing in which.

SPECIFIC DESCRIPTION

Figure 1:
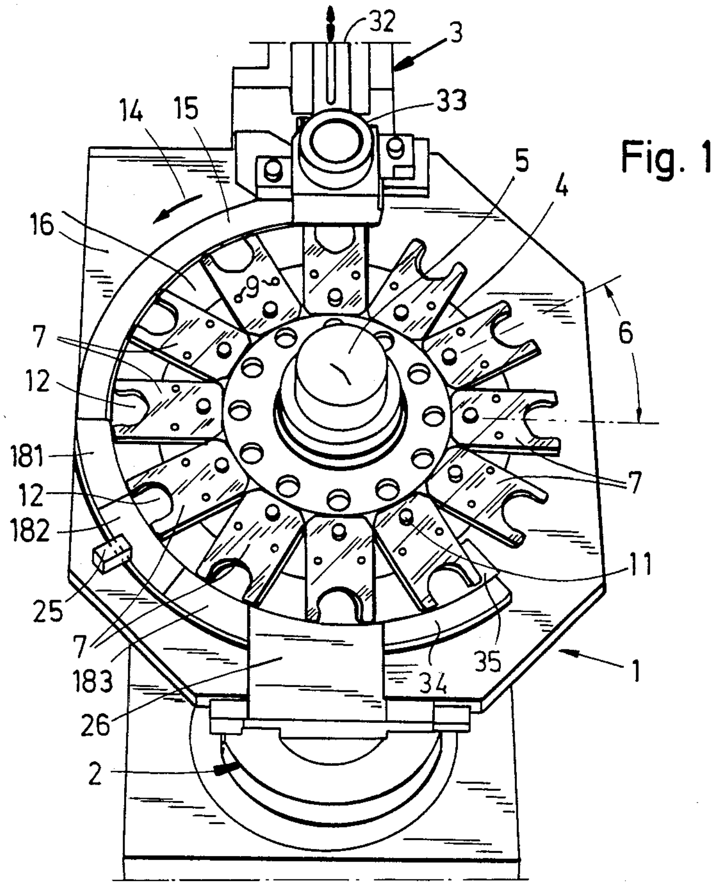
FIG. 1 is a perspective view, from above, of a blank-feeding mechanism embodying our invention.

In FIG. 1 we have shown a feeding system 1 associated with a coining press 2 of which only a base has been illustrated in that Figure. A turntable 4, secured to an intermittently driven vertical shaft 5, supplies the press 2 with polygonal blanks 13 (FIGS. 2, 4 and 5) from a diametrically opposite loading station 3 including a storage tube 33 for a stack of such blanks. Turntable 4 is provided with an even number (here 12) of radially oriented, generally rectangular transport plates 7 with projecting ends having recesses 12 designed to receive these blanks. A pusher 32 at loading station 3 periodically thrusts the lowest blank of the stack into the recess 12 of a confronting plate 7 at an instant when the turntable is arrested in a position in which the diametrically opposite transport plate is aligned with a pair of dies of press 2 as more fully described hereinafter with reference to FIGS. 6 and 7. Shaft 5 advances by an angle 6 of 30° at a time, with the aid of a nonillustrated stepping motor synchronized with the operation of press 2 and pusher 32; the drive for these components is schematically represented at 100 in FIG. 2.

Figure 2:
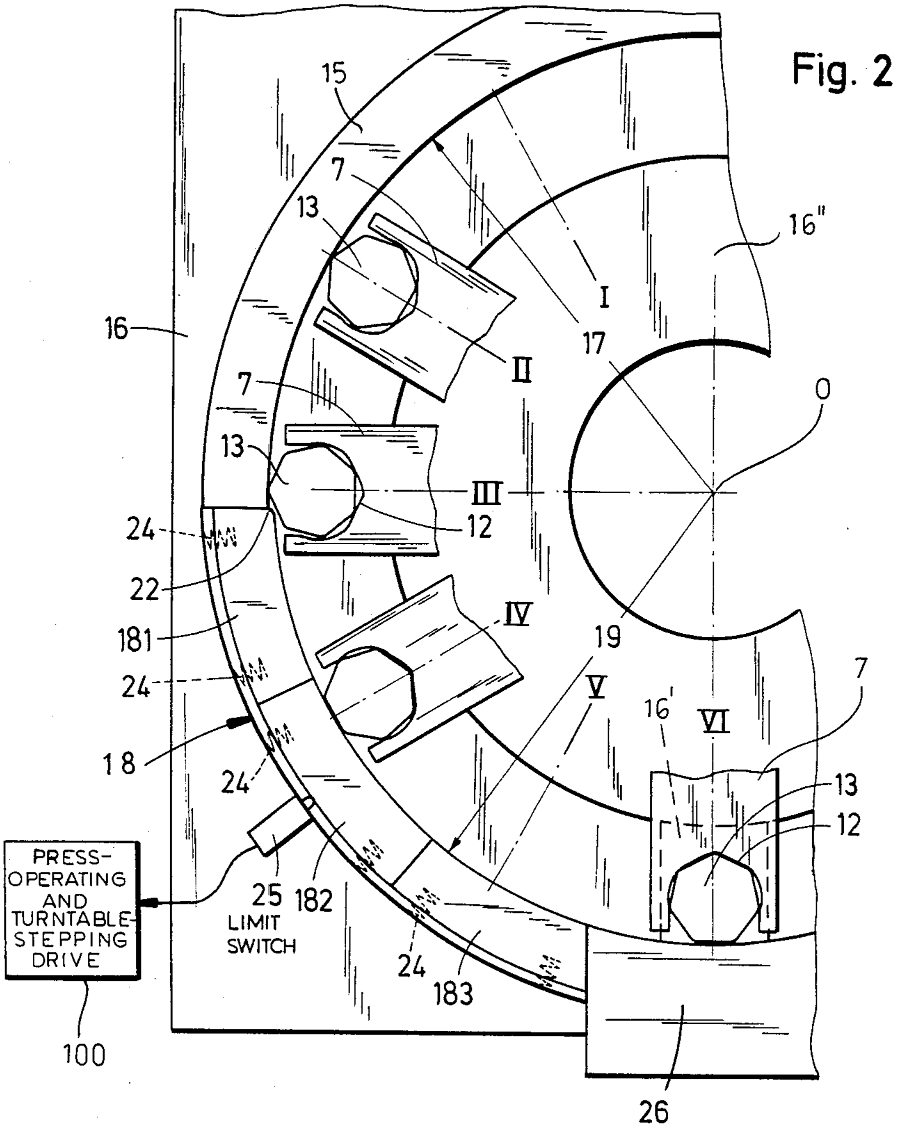
FIG. 2 is a top view of part of the mechanism of FIG. 1, drawn to a larger scale.

As shown in FIGS. 2–5, each transport plate 7 has two indexing apertures 8 and one mounting aperture 10 to be respectively penetrated by two locator pins 9 and a fastening screw 11 shown in FIG. 1. These plates, accordingly, are detachably secured to turntable 4 with radial centerlines spaced by the stepping angle 6. With turntable 4 rotating counterclockwise, as indicated by an arrow 14 in FIG. 1, a given blank inserted into a transport plate 7 at loading station 3 will reach the press 2 after six turntable steps, i.e. upon passing through as many rest positions which have been designated I–VI in FIG. 2. During the first three steps, while moving through an arc of 90° into position III, the inserted blank passes along the inner periphery of a ring segment 15 fixedly mounted on a supporting table 16. Another ring segment 18, centered like segment 15 on the axis 0 of shaft 5, confronts the recesses 12 during the remainder of the path traveled by the engaged blanks from loading station 3 to press 2. There is also a fixed abutment 26 confronting the recess of a plate 7 in the immediate vicinity of a position of alignment with the stamping tools of the press. In contrast to ring segment 15 and abutment 26, ring segment 18 is outwardly yieldable against the force of biasing springs 24 as shown in FIG. 2; this segment is divided into three segments 181, 182, 183 each encompassing an arc of 30° corresponding to stepping angle 6. Table 16 extends inward beyond ring segments 15, 18 and abutment 26 to form a part-spherical supporting zone underlying the projecting ends of the blank-carrying plates 7; this zone is interrupted by an opening 16', as seen in FIG. 2, at the stamping position VI but continues therebeyond along an extension 34 of abutment 26 to a discharge port 35 for the finished coins. An inner annular zone 16'' of table 16 underlies a peripheral portion of turntable 4.

Figure 3:
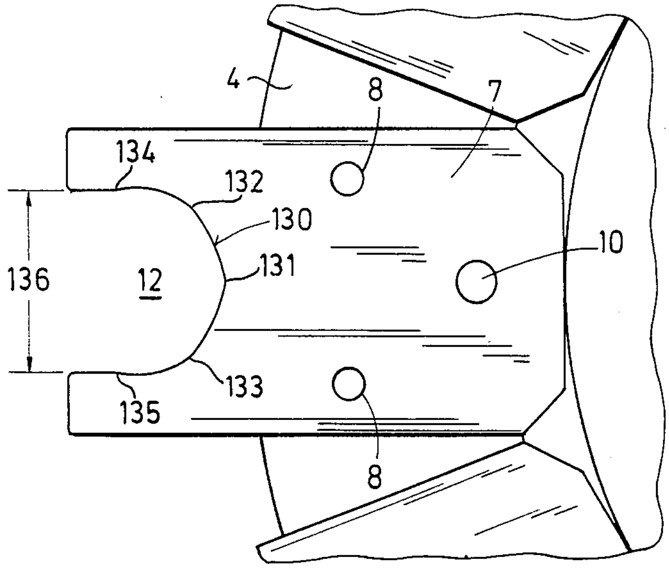
FIG. 3 is a fragmentary top view of a turntable forming part of that mechanism, drawn to a still larger scale and showing an empty transport plate.

From FIG. 3 it will be noted that the recess 12 of any transport plate 7 has a boundary 130 forming two angularly adjoining inner edges between a central point 131 and two lateral points 132, 133 flanking same. Beyond points 132 and 133 this boundary is concave up to a pair of further lateral points 134 and 135. The open end of recess 12 is bounded by two parallel jaws with a spacing 136 which exceeds with very small tolerance the maximum width 21 (FIG. 5) of a blank 13, thereby enabling the latter to be inserted in any angular position into the recess and to turn freely therein.

Figure 4:
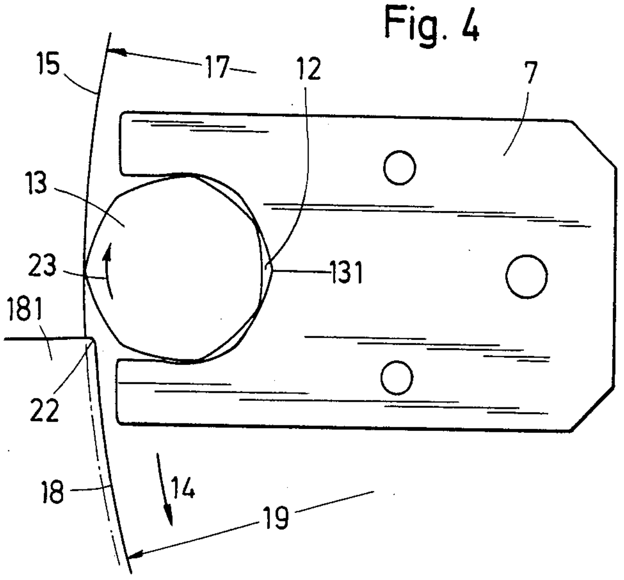
FIGS. 4 and 5 are views similar to that of FIG. 3, respectively showing an incorrectly positioned and a correctly positioned blank held by the plate.
Figure 5:
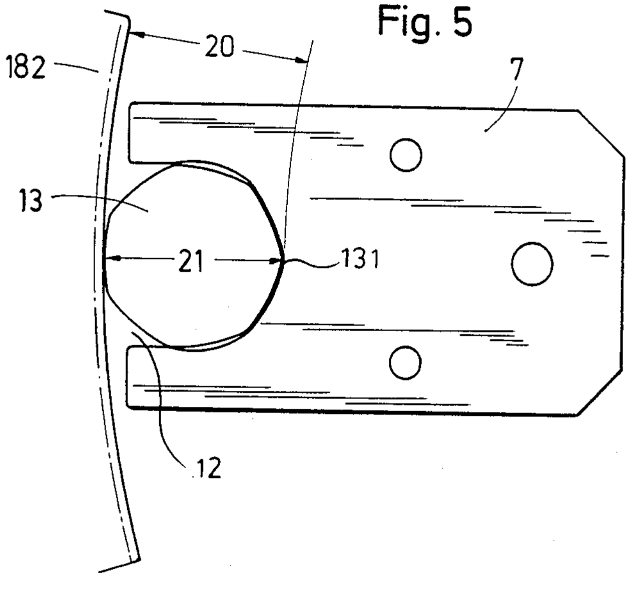

In the specific example here described, and as clearly seen in FIGS. 4 and 5, the blanks 13 have the outline of a regular heptagon, albeit with slightly curved sides; adjacent sides include with each other an angle equal to that defined by boundary 130 at point 131. The depth of recess 12 is less than the blank width 21 whereby a small part of each blank protrudes radially outward from its recess. In the present instance, the width 21 is measured from a corner of the 7-sided polygon to its diametrically opposite side which, when the blank is correctly inserted as illustrated in FIG. 5, lies perpendicular to the centerline of plate 7 outside recess 12 as the opposite corner coincides with its innermost point 131 so that the adjoining sides register with the inner edges of that recess. In a nonregistering position such as that shown in FIG. 4, however, one of the corners of the polygon protrudes beyond the recess by a distance significantly greater than that shown in FIG. 5 for the correctly positioned blank.

The inner peripheral edge of the fixed ring segment 15 is spaced from the axis of rotation 0 (FIG. 2) by a radius 17 sufficient to accommodate the wrongly positioned blank 13 of FIG. 4 as well as any other blank whose position is closer to that of FIG. 5. Thus, the pusher 32 of FIG. 1 may introduce the blanks with any angular orientation into the recess of a transport plate aligned therewith and any blank, in turn, may change its position within the recess during the first quarter of a revolution of the turntable. Immediately after stopping at rest position III, however, the protruding corner of an improperly oriented blank encounters a discontinuity 22 at a radial edge of the first section 181 of ring segment 18 projecting slightly inward beyond the inner periphery of segment 15, the collision of the protruding corner with discontinuity 22 tending to turn the blank clockwise in its recess from a position similar to that of FIG. 4 into the proper position shown in FIG. 5. The force of this collision will be determined by the instantaneous rotary speed of turntable 4, i.e. by the degree to which the turntable has accelerated after leaving the immediately preceding rest position III.

With sections 181–183 of ring segment 18 independently pressed against nonillustrated inner stops by respective sets of biasing springs 24, an outward deflection of the first section 181 by an improperly positioned blank 13 resisting reorientation will not effect the subsequent sections 182 and 183. As the blank moves past section 181, the pressure exerted by the associated springs 24 may still bring the blank into the correct position (possibly by counterclockwise rotation in its recess) before it reaches the next section 182. If, however, a corner of the blank is still separated from the orbit of the innermost point 131 by a distance greater than that shown at 20 in FIG. 5, the second section 182 will also be repressed and thereby activate a position sensor in the form of a limit switch 25 which immediately arrests the drive 100 so that the blank in question will not reach the press 2. Manual removal of that blank from its recess, or a proper repositioning therein, will of course let the section 182 return from its repressed position (indicated by a dot-dash line in FIG. 5) to its normal position, spaced from axis 0 by a radius 19 slightly smaller than radius 17, so that operations can resume as the inhibiting signal from sensor 25 is terminated.

When the outline of the blank is a regular polygon with an even number of sides, e.g. a hexagon, the boundary 131 of recess 12 will have to be modified so that an innermost edge thereof is perpendicular to the centerline of the recess and adjoins two neighboring edges at the proper obtuse angle. The mode of operation will then be essentially the same as that described above.

Any blank moving past rest position V into contact with abutment 26, whose inner edge also has the radius 19, will of course have the proper orientation. Upon arriving above the opening 16' formed in the supporting table surface, the blank comes to rest on a lower die of press 2 as described hereinafter with reference to FIG. 6. After embossing, the blank now turned into a finished coin is further transported by the associated plate 7 to the discharge port 35. In principle, contrary to the mode of operation described hereinafter, such embossing may take place without removal of the blank from its recess, i.e. with an upper die descending to press the blank against the underlying lower die.

Figure 6:
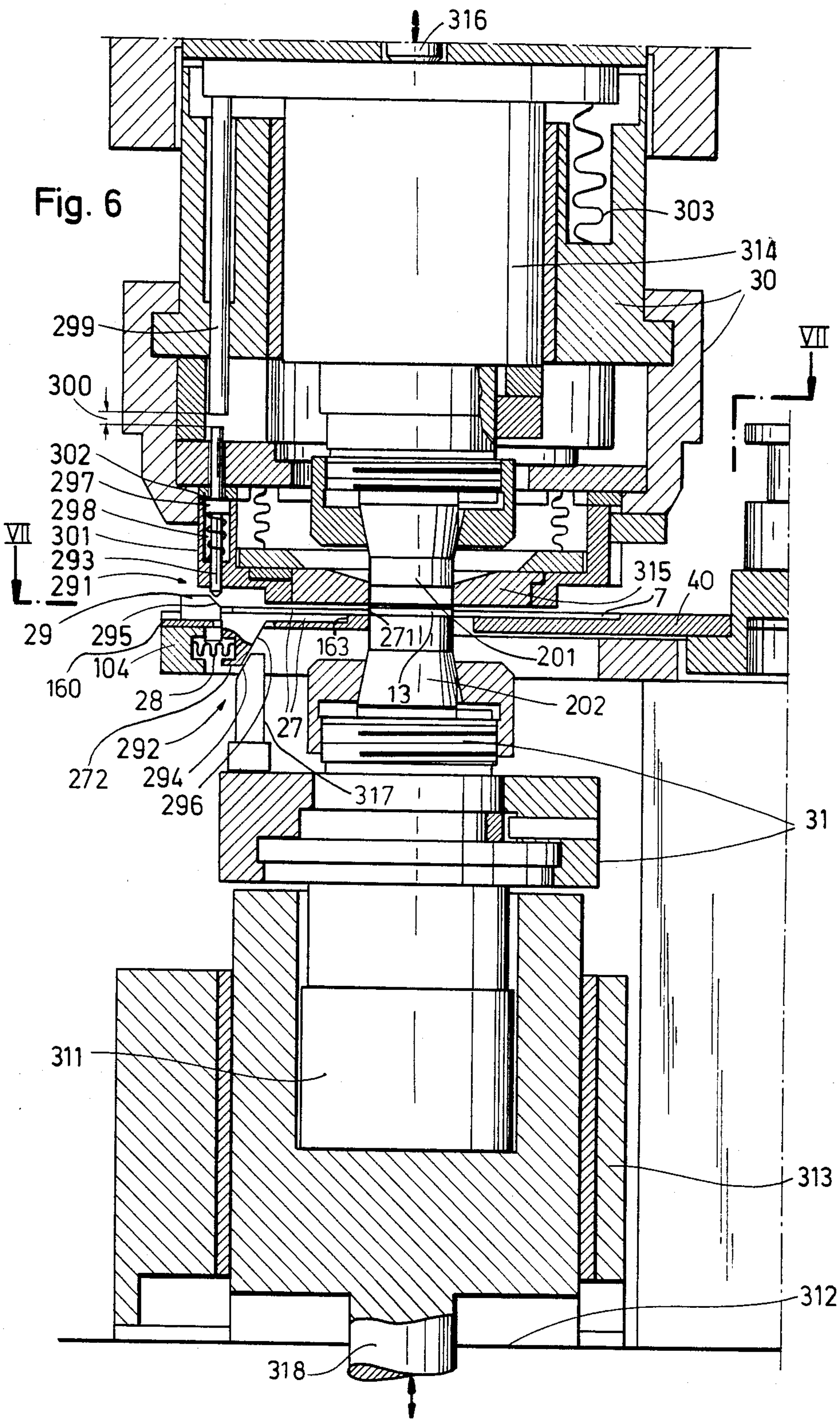
FIG. 6 is a sectional elevational view of a die-stamping press to which blanks are fed by a mechanism similar to that shown in FIGS. 1 and 2.
Figure 7:
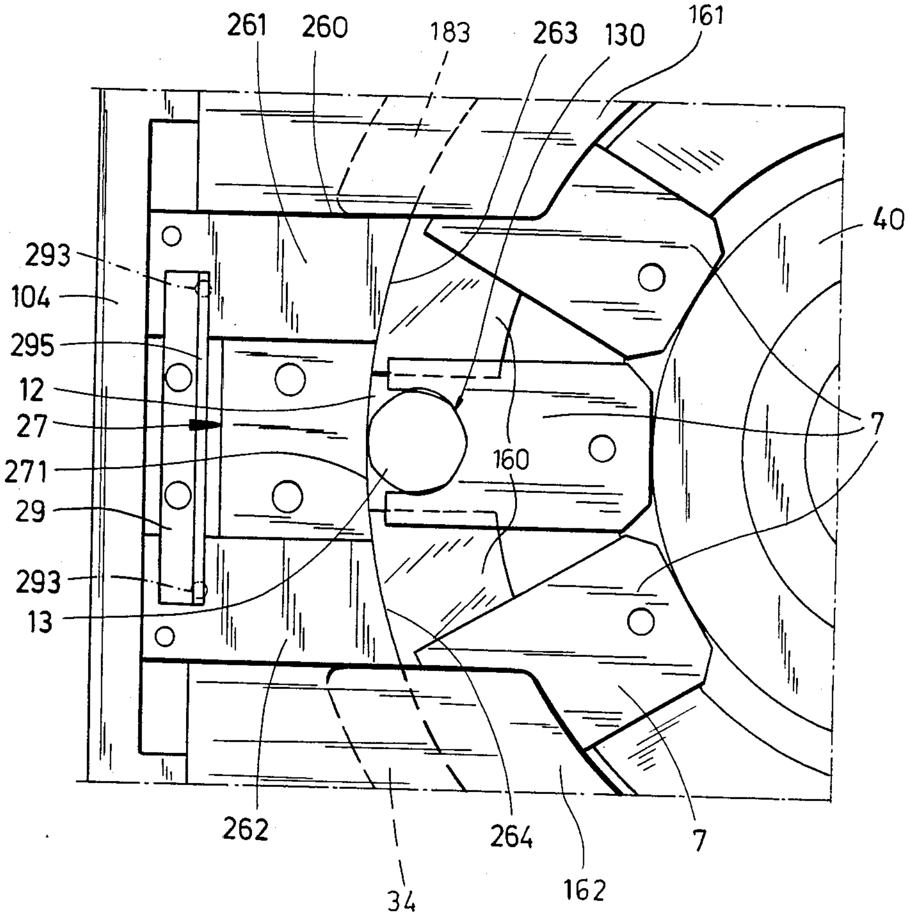
FIG. 7 is a fragmentary top view of the lower part of the press of FIG. 6, taken on the line VII—VII thereof.

FIG. 6 is an axial sectional view of a die-stamping or coining press associated with a feeding system differing only in some details from that described with reference to the preceding Figures. The press includes an upper die 201 and a lower die 202 respectively disposed, along a vertical axis passing through a blank 13 arrested in position VI of FIG. 2, above and below the level of a turntable 40 which carries the transport plates 7 shown in FIG. 7. The fixed abutment 26 of FIGS. 1 and 2 is here replaced by two stationary guide strips 261, 262 with concave edges 263, 264 again having the same radius of curvature 19 as the adjoining section 183 of ring segment 18; strip 262 is integral with extension 35. FIG. 7 also shows part of two further fixed ring segments 161 and 162 which fixedly overhang at least part of the orbit of recesses 12 of transport plates 7 but for clarity's sake have been omitted in FIGS. 1 and 2; they have the purpose of preventing the blanks from climbing out of their recesses. The supporting table 16 of the preceding Figures is here replaced by a horizontal frame 104 carrying a table top 160.

Strips 261 and 262 bracket a slider 27 which is limitedly displaceable on table top 160 in a radial direction and has an arcuate edge 271 of radius of curvature 19 normally forming a continuation of guide edges 263 and 264, thereby holding an arriving blank 13 in position. Slider 27, whose upper surface is coplanar with those of transport plates 7, strips 261, 262 and ring segments 15, 18, is biased inward against stop 163 by a compression spring 28 inserted between frame 104 and a downward projection 272 of the slider. A transverse bar 29 on the outer end of slider 27 has a beveled face 295 coacting with two camming rods 293 whose positions are indicated in phantom lines in FIG. 7 and one of which is visible in FIG. 6. The two rods 293 have pointed lower tips and are vertically guided in a base 301 of a housing 30 surrounding the upper die 201 which is secured to a mounting block 314. A shoulder 297 of each rod 293 is biased by a coil spring 298 against a stop 302 of base 301 beyond which an upper extremity of the rod projects into the interior of housing 30 in line with an associated plunger 299 rigid with block 314. This block is urged by further coil springs 303 (only one shown) against the top of housing 30 which it contacts in a retracted position wherein the plungers 299 are spaced from the respective rods 293 by small vertical gaps 300. These gaps 300 thus establish a lost-motion coupling between die holder 314 and rods 293 which are part of a camming assembly 291 including the coacting beveled face 295 of bar 29. Projection 272 has a beveled face 296 closely adjoining a similarly beveled face 294 of a stud 317 rising from a holder 31 supporting the lower die 202. Stud 317 and projection 272 constitute another camming assembly 292 for translating a vertical motion of die 202 into a radial motion of slider 27.

Die holder 31 is rigid with a block 311 lodged in the head of a ram 318 which is vertically reciprocable by the drive means 100 (FIG. 2) in timed relationship with the stepwise rotation of turntable 4. Thus, the halting of the turntable with a blank 13 is rest position VI is immediately followed by a rise of die 202 lifting that blank from its recess into a bushing 315 forming a seat of corresponding polygonal cross-section which is replaceably held in housing base 301 and into which the upper die 201 partially extends in its retracted position; thus, the blank is compressed and embossed between the two dies within bushing 315 in which it is retained by friction when the lower die 202 is subsequently retracted downward. An ejector 316 also controlled by drive 100 then depresses the upper die holder 314 against the restoring force of springs 303 to dislodge the finished workpiece from bushing 315 and return it to the recess of the plate 7 still held in position VI. Ejector 316 could also be operated to let the die 201 descend partly during the stamping operation, without affecting the position of slider 27.

During the upstroke of lower die 202, camming assembly 292 retracts the slider 27 to release the blank from any constraint with which it may have been held in its recess 12. As the die 202 descends, slider 27 returns to its normal position from which it is again retracted in the latter phase of the ensuing downstroke of die 201, i.e. upon closure of the lost-motion gap 300 and just before the embossed workpiece returns to the level of its transport plate 7. Thus, the former blank will fit neatly into that recess even if it has been slightly expanded during the stamping operation. If necessary, edge 264 of guide strip 262 and its extension 34 may be slightly set back from edge 263 of guide strip 261 in order to allow for such expansion; in the event of a significant expansion, slider 27 might not return to its normal position until the embossed workpiece has moved beyond its edge 271.

A feeding system according to our disclosed invention is operable at rates up to about 500 press cycles per minute.

We claim:

1. In a plant for the embossing of blanks of polygonal outline, comprising a die press, a turntable with peripheral cutouts rotating stepwise in synchronism with the operation of said die press for feeding successive blanks to the latter for embossing, and loading means rotate from said die press for inserting fresh blank into empty cutouts of said turntable, the improvement wherein each of said cutouts is a radially outwardly open recess provided above a table supporting said blanks, said recesses each having angular adjoining inner edges conforming to part of said polygonal outline and with two substantially parallel jaws spaced apart by about the maximum width of said blanks for receiving same in any angular position from said loading means, said recess having a radial depth less than the minimum width of said blanks, said inner edges being so oriented that a blank inserted in registry therewith protrudes beyond said jaws to a minor extend with one side of the polygon whereas a blank inserted out of registry protrudes to a larger extent with one corner, the path of the inserted blanks being bounded in a first part thereof by a first ring segment centered on the axis of rotation of said turntable and separated from the orbit of said jaws by a first arcuate clearance accommodating blanks inserted in improper positions out of registry, said path being bounded in a second part thereof by a second ring segment centered on said axis of rotation and separated from said orbit by a narrower second arcuate clearance accommodating only blanks inserted in a properly reigistering position, an edge of said second ring segment adjacent said first ring segment forming a discontinuity tending to reorient an improperly positioned blank by engaging the protruding corner thereof, said second ring segment being provided with biasing means resiliently resisting a widening of said second arcuate clearance under pressure of an improperly positioned blank, said second ring segment being divided into a plurality of independently spring-loaded sections able to yield generally radially outward under pressure from an improperly positioned blank, one of said sections immediately adjoining said first ring segment forming said discontinuity while another of said sections is provided with sensing means responsive to an outward repression thereof for arresting said die press and said turntable.

2. An embossing plant as defined in claim 1, further comprising alarm means responsive to a widening of said second arcuate clearance.

3. An embossing plant as defined in claim 1, further comprising an abutment in the region of said die press, said abutment having an inner edge separated from said orbit by a third arcuate clearance having a width equal to the normal width of said second arcuate clearance.

4. An embossing plant as defined in claim 1 wherein the number of said sections is three, said sensing means coacting with the middle one of said sections.

5. An embossing plant as defined in claim 4 wherein each of said sections extends over substantially 30°.

6. An embossing plant as defined in claim 1 wherein said cutouts are formed in respective transport plates detachably secured to said turntable with recessed ends projecting radially therefrom.

7. An embossing plant as defined in claim 1 wherein said discontinuity is located between two positions at which said cutouts come to rest in the stepwise rotation of said turntable.

8. An embossing plant as defined in claim 1 wherein said path extends over substantially half the circumference of said turntable, each of said ring segments encompassing about a quarter of said circumference.

9. In a plant for the embossing of blanks of polygonal outline, comprising a die press, a turntable with peripheral cutouts rotating stepwise in synchronism with the operation of said die press for feeding successive blanks to the latter for embossing, and loading means remote from said die press for inserting fresh blanks into empty cutouts of said turntable, the improvement wherein each of said cutouts is a radially outwardly open recess provided above a table supporting said blanks, said recesses each having angularly adjoining inner edges conforming to part of said polygonal outline and with two substantially parallel jaws spaced apart by about the maximum width of said blanks for receiving same in any angular position from said loading means, said recess having a radial depth less than the minimum width of said blanks, said inner edges being so oriented that a blank inserted in registry therewith protrudes beyond said jaws to a minor extent with one side of the polygon whereas a blank inserted out of registry protrudes to a larger extent with one corner, the path of the inserted blanks being bounded in a first part thereof by a first ring segment centered on the axis of rotation of said turntable and separated from the orbit of said jaws by a first arcuate clearance accommodating blanks inserted in improper positions out of registry, said path being bounded in a second part thereof by a second ring segment centered on said axis of rotation and separated from said orbit by a narrower second arcuate clearance accommodating only blanks inserted in a properly registering position, an edge of said second ring segment adjacent said first ring segment forming a discontinuity tending to reorient an improperly positioned blank by engaging the protruding corner thereof, said path being further bounded in the region of said die press by abutment means including a retractable slider normally separated from said axis by a distance equal to the inner radius of said second ring segment, said die press being provided with stamping means aligned with each of said recesses as said recesses successively are aligned with said slider and operatively coupled with said slider for retracting same prior to the embossing of a blank aligned therewith.

10. An embossing plant as defined in claim 9 wherein said stamping means comprises an upper die and a lower die bracketing an aligned blank therebetween, said lower die being operable to elevate the aligned blank into an overlying retaining collar for engagement by said upper die, said lower die and said slider being provided with first coacting cam means for retracting said slider during an upstroke of said lower die, said upper die being operable to dislodge the embossed blank from said retaining collar and returning same to the aligned recess, said upper die and said slider being provided with second coacting cam means for retracting said slider during a downstroke of said upper die.

11. An embossing plant as defined in claim 10 wherein said second cam means includes a lost-motion coupling.

12. An embossing plant as defined in claim 10 wherein said slider is provided with spring means biasing same into a normal position of minimum distance from said turntable.

13. An embossing plant as defined in claim 12 wherein said slider is provided with a lower beveled flank forming part of said first cam means and with an upper beveled flank forming part of said second cam means.

14. An embossing plant as defined in claim 13 wherein said first cam means further comprises a beveled stud rigid with said lower die and engageable with said lower flank, said second cam means further comprising a pointed rod engageable with said upper flank and depressible against an upwardly acting biasing force by a plunger rigid with said upper die, said plunger being normally spaced from said rod by a vertical gap equaling a fraction of the downstroke of said upper die.

* * * * *